Jan. 29, 1946.  T. R. SCOTT  2,393,935
JOINT FOR ELECTRIC POWER CABLES
Filed March 24, 1942
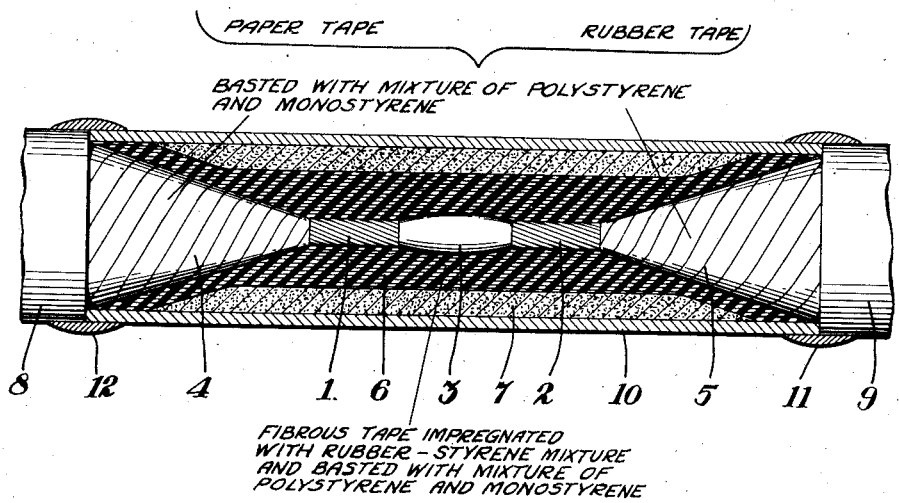
INVENTOR.
THOMAS ROBERTSON SCOTT
BY
ATTORNEY Patented Jan. 29, 1946

2,393,935

UNITED STATES PATENT OFFICE 2,393,935

JOINT FOR ELECTRIC POWER CABLES

Thomas Robertson Scott, London W. C. 2, England, assignor to Federal Telephone and Radio Corporation Application March 24, 1942, Serial No. 436,021
In Great Britain October 31, 1941

14 Claims. (Cl. 174—84)

This invention relates to joints for elastic power cables; and has for its object to provide a satisfactory joint between the ends of two dissimilar cables, namely, a paper-insulated cable and a rubber-insulated cable.

The invention consists in wrapping or taping the joint with a tape of fibrous material which has been impregnated with a mixture of rubber and polystyrene. This material will unite with both ends of the joint.

The general method of making the joint would be like that described in my prior patents Nos. 2,272,615 and 2,298,654 relating to a cold process of making a styrenated paper joint, the basting or painting material applied between the layers being diluted if necessary to prevent undue swelling of the styrene. The principal difficulty, however, appears to lie with the first layer of tape on the rubber insulation, owing to the facts that monomeric styrene both swells rubber and diffuses through it: on its first application to the rubber insulation the monomeric styrene will vigorously swell the superficial layer, but eventually it will diffuse throughout the rubber and thus reduce the original swelling at the surface. Accordingly it is a further feature of the invention that the basting material applied to the insulation of the rubber cable shall be a mixture of polystyrene and monostyrene applied sparingly so that the content of monomeric styrene is comparatively low: the polystyrene is introduced into the swollen rubber to prevent undue reduction of the swelling while at the same time helping to bind the rubber to the styrene rubber coating of the fabric tape.

The tape which is impregnated with rubber and polystyrene preferably consists of acetylated cotton ("cotopa"), or acetylated paper, the acetylation being desirable because the tape then possesses a low hygroscopic value.

The drawing shows a cable joint in accordance with this invention. The cables 1 and 2 to be jointed are stripped of their protective coverings, e. g., lead sheaths, textile braiding, proof tapes, etc., so that for a sufficient distance (dependent on the voltage rating of the cables) from the exposed conductors (1 and 2 respectively) the insulation consists of impregnated paper 4 and vulcanised rubber 5 respectively. After connecting the conductors 1 and 2 by well known connecting means 3 the two insulations 4 and 5 are basted with a mixture of polystrene and monostyrene (to which a suitable plasticiser may have been added). One or more layers of fibrous tape 6 impregnated with rubber/styrene (plasticised if desired and/or loaded with solid insulating material by the well known process of milling, etc.) are then lapped over the joint, each layer after application being painted or basted with the basting mixture.

The paper insulated cable will have a lead sheath 8. The rubber cable may or may not have a lead sheath 9. If it has it will be desirable to apply by well known methods a metallic sleeve 10 forming a waterproof junction between the two lead sheaths. In such a case it may be convenient to restrict the lapping of the joint to one or two layers and to fill in the space within the sleeve with compound 7 containing polystyrene. 11 and 12 are the usual wiped joints. If the rubber cable has no lead sheath it will be necessary to build up the lapped insulation to a point at which the paper insulation of the one cable is sufficiently shielded from moisture absorption. It may be found desirable to extend the metallic sheathing of the cable by lapping over the joint flexible metallic tape, e. g., lead foil, care being taken to terminate this in such a way over the rubber cable that no concentration of electrical stress is set up. It may be convenient to terminate the protective coverings, e. g., proofed tape and/or compounded braiding of the rubber cable over this metallic tape.

The processes described may be applied to either single conductor or multi-conductor cables.

What is claimed is:

1. A cable joint comprising a paper-insulated cable joined to a rubber-insulated cable, a fibrous tape impregnated with a mixture of rubber and polystyrene wrapped around the connected cables and the paper and rubber insulation adjacent the connection.

2. A joint as claimed in claim 1, in which the fibrous tape has a low hygroscopic value about equal to that of acetylated cellulose.

3. A joint as claimed in claim 1 in which the fibrous tape is of acetylated cotton.

4. A cable joint according to claim 1, in combination with a thin film of a polystyrene-monostyrene mixture over the rubber insulation and beneath the fibrous tape.

5. A cable joint according to claim 1, in combination with a thin film of a polystyrene-monostyrene mixture over the paper and rubber insulations and beneath the fibrous tape.

6. A cable joint according to claim 1, in combination with a thin film of a polystyrene-monostyrene mixture intermediate the wrappings of the fibrous tape.

7. A cable joint according to claim 1, in combination with thin films of a polystyrene-monostyrene mixture over the paper and rubber insulations and intermediate the wrappings of the fibrous tape.

8. A cable joint comprising a paper-insulated cable joined to a rubber-insulated cable, said cables being provided with outer sheaths, the abutting conductor ends of the cables being bared and joined by a connecting means, a fibrous tape impregnated with a mixture of rubber and polystyrene wrapped around the bared conductors and the paper and rubber insulation adjacent the connection, and a sleeve over the wrapping of tape extending between the sheaths of the cables.

9. A cable joint according to claim 8, including a polystyrene filling between the sleeve and the tape wrapping.

10. A cable joint comprising a paper-insulated cable joined to a rubber-insulated cable, a fibrous tape impregnated with a mixture of rubber, polystyrene and a plasticizer, wrapped around the connecting cables and the paper and rubber insulation adjacent to the connection.

11. A method of forming a cable joint between a paper-insulated cable and a rubber-insulated cable which comprises forming a joint between the cable conductors, basting the end portion of the rubber insulation with a mixture of polystyrene and monostyrene sparingly applied, and wrapping a fibrous tape impregnated with a mixture of rubber and polystyrene around the cable joint and the ends of the paper and rubber insulation.

12. A method as outlined in claim 11 in which the fibrous tape is basted with a mixture of polystyrene and monostyrene.

13. A method as set forth in claim 11 in which the wrapping and basting operations are carried out in the cold.

14. The method according to claim 11 in which the paper insulation as well as the rubber insulation is basted with a mixture of polystyrene and monostyrene, sparingly applied.

THOMAS ROBERTSON SCOTT.